United States Patent
Takayama

(10) Patent No.: US 8,040,396 B2
(45) Date of Patent: Oct. 18, 2011

(54) IMAGE CAPTURING APPARATUS AND IMAGE CAPTURING METHOD

(75) Inventor: Jun Takayama, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 566 days.

(21) Appl. No.: 12/300,911

(22) PCT Filed: May 14, 2007

(86) PCT No.: PCT/JP2007/059851
§ 371 (c)(1),
(2), (4) Date: Nov. 14, 2008

(87) PCT Pub. No.: WO2007/135885
PCT Pub. Date: Nov. 29, 2007

(65) Prior Publication Data
US 2009/0201385 A1    Aug. 13, 2009

(30) Foreign Application Priority Data

May 18, 2006   (JP) ................. 2006-139172

(51) Int. Cl.
H04N 9/68 (2006.01)
(52) U.S. Cl. .................... 348/234; 348/235
(58) Field of Classification Search ............ 348/234, 348/235, 222.1, 223.1, 272; 382/162
See application file for complete search history.

(56) References Cited

U.S. PATENT DOCUMENTS

| | | | | |
|---|---|---|---|---|
| 6,204,881 B1 * | 3/2001 | Ikeda et al. | ............. | 348/362 |
| 7,864,232 B2 * | 1/2011 | Kinoshita et al. | ............. | 348/272 |
| 7,965,324 B2 * | 6/2011 | Sudo | ............. | 348/234 |

FOREIGN PATENT DOCUMENTS

| JP | 545574 | 2/1993 |
|---|---|---|
| JP | 6253199 | 9/1994 |
| JP | 07244717 | 9/1995 |
| JP | 109827 | 1/1998 |
| JP | 2000186929 | 7/2000 |
| JP | 2000347133 | 12/2000 |
| JP | 200183407 | 3/2001 |
| JP | 2001141988 | 5/2001 |

* cited by examiner

Primary Examiner — Tuan Ho
(74) Attorney, Agent, or Firm — Lucas & Mercanti, LLP

(57) ABSTRACT

There is described an image capturing apparatus, which makes it possible to conduct a high-accurate range finding operation irrespective of the position of the subject. The apparatus, comprises: a plurality of imaging elements; a plurality of luminance signal generating sections, each of which generates a luminance signal by mixing the plural wavelength signals with each other at a predetermined mixture ratio; a plurality of mixture ratio controlling sections, which respectively correspond to the plurality of imaging elements, and each of which changes a mixture ratio, at which the plural wavelength signals are mixed with each other, based on a positional relationship between a corresponding one of the plurality of imaging elements and a subject; and a range detecting section to detect a distance to the subject, based on a correlation between luminance signals, each of which is the luminance signal generated by each of the luminance signal generating sections.

42 Claims, 7 Drawing Sheets

IMAGE CAPTURING APPARATUS AND IMAGE CAPTURING METHOD

This is a U.S. National Phase Application under 35 U.S.C. 371 of International Application PCT/JP2007/059851, filed on May 14, 2007, which claims the priority of Japanese Application No. 2006-139172, filed May 18, 2006, the entire content of both Applications are hereby incorporated by reference.

FIELD OF THE INVENTION

The present invention relates to an image capturing apparatus and an image capturing method, and specifically relates to such an image capturing apparatus that employs a plurality of imaging elements to capture a three dimensional image.

TECHNICAL BACKGROUND

Conventionally, there has been well-known such a three-dimensional image capturing apparatus that captures images of a subject from different positions by employing a plurality of imaging elements, so as to measure a position (a distance) of the subject on the basis of a parallax between the images of the same subject by using parameters, such as positions of the imaging elements, a focal distance, etc. (refer to Patent Document 1-3).

In the three-dimensional image capturing apparatus above-mentioned, the luminance signal Y derived from each of the wavelength signals (for instance, RGB signals, etc.) is employed for detecting the distance to the subject. Conventionally, the luminance signal Y has been found by mixing the wavelength signals, outputted form the imaging elements, at a fixed mixing ratio. For instance, with respect to the RGB signals, the luminance signal Y has been found by mixing the RGB signals according to the predetermined mixing ratio defined by the following Equation.

$$Y = 0.3 \times R + 0.6 \times G + 0.3 \times B$$

Further, the three-dimensional image capturing apparatus, mentioned in the above, has been so designed that it is possible to focus the subject whose distance is in a range of several ten centimeters to infinitive, when a fixed focal lens is employed for measuring the distance to the subject. Still further, the three-dimensional image capturing apparatus has evaluated the MTF (Modulation Transfer Function) of the luminance signal Y, etc., to determine Whether or not the subject is currently in focus, and accordingly, the range finding accuracy of the subject has been depending on the above-mentioned MTF. Since the luminance signal Y abovementioned includes a large amount of the G signal component, the MTF characteristic of the luminance signal Y is approximate to that of the G signal component.

[Patent Document 1]
Tokkaihei 7-244717 (Japanese Non-Examined Patent Publication)
[Patent Document 2]
Tokkai 2000-186929 (Japanese Non-Examined Patent Publication)
[Patent Document 3]
Tokkai 2000-347133 (Japanese Non-Examined Patent Publication)

Generally speaking, however, a focal point of the light reflected from the subject and penetrated through a pan-focus lens varies depending on the wavelength of the light concerned. For instance, as shown in FIG. 7, when the light reflected from the subject is focused onto a focal surface by pan-focus lens 16, the position of the focal surface varies depending on the wavelength of the light, such as Red (R), Green (G) or Blue (B). Further, as shown in FIG. 8(*a*), FIG. 8(*b*) and FIG. 8(*c*), when the focal lengths of lenses 17*a*, 17*b* and 17*c* are set at a constant value, an optimum position at which the subject is in focus varies depending on the wavelength of the light. Concretely speaking, the Red light reflected from the subject, located at a farther position compared to the Green light, is in focus as shown in FIG. 8(*c*) and FIG. 8(*b*), while the blue light reflected from the subject, located at a nearer position compared to the Green light, is in focus as shown in FIG. 8(*a*) and FIG. 8(*b*).

Accordingly, when the subject is positioned at such a close range that is equal to or shorter than several tens centimeters, the MTF characteristic of the luminance signal Y that includes a large amount of Green light signal as aforementioned is deteriorated and resulted in a blurred image, though the high MTF characteristic can be acquired with respect to the Blue light signal. Further, when the subject is a distant view, the MTF characteristic of the luminance signal Y that includes a large amount of Green light signal is deteriorated as well, though the high MTF characteristic can be acquired with respect to the Red light signal. As abovementioned, there has been a problem that, sometimes depending on the position of the subject, it is impossible to acquire a high accuracy of the range finding, when the luminance signal Y, generated by mixing the wavelength signals at a fixed mixing ratio, is employed.

SUMMARY OF THE INVENTION

To overcome the abovementioned drawbacks in conventional image capturing apparatus and method, it is one of objects of the present invention to provide an image capturing apparatus and an image capturing method, which makes it possible to conduct a high-accurate range finding operation irrespective of the position of the subject, when the image capturing apparatus and the image capturing method employs a plurality of imaging elements.

Accordingly, at least one of the objects of the present invention can be attained by the image capturing apparatuses and the image capturing methods described as follows.

(1) According to an image capturing apparatus reflecting an aspect of the present invention, the image capturing apparatus, comprises: a plurality of imaging elements, each of which converts incident light to electric signals including plural wavelength signals; a plurality of luminance signal generating sections, which respectively correspond to the plurality of imaging elements, and each of which generates a luminance signal by mixing the plural wavelength signals, outputted from a corresponding one of the plurality of imaging elements, with each other at a predetermined mixture ratio; a plurality of mixture ratio controlling sections, which respectively correspond to the plurality of imaging elements, and each of which changes a mixture ratio, at which the plural wavelength signals are mixed with each other, based on a positional relationship between a corresponding one of the plurality of imaging elements and a subject; and a range detecting section to detect a distance to the subject, based on a correlation between luminance signals, each of which is the luminance signal generated by each of the luminance signal generating sections.

(2) According to an image capturing apparatus reflecting another aspect of the present invention, the image capturing apparatus, comprises: a plurality of imaging elements, each of which converts incident light to electric signals including plural wavelength signals; a plurality of filters, which respectively correspond to the plurality of imaging elements, and each of which separates high frequency components and low frequency components from the plural wavelength signals outputted by a corresponding one of the plurality of imaging elements; a plurality of low-luminance signal generating sections, which respectively correspond to the plurality of imaging elements, and each of which generates a low-luminance signal by mixing the low frequency components with each other at a first-predetermined mixture ratio; a plurality of luminance signal generating sections, which respectively correspond to the plurality of imaging elements, and each of which generates a high-luminance signal by mixing the high frequency components with each other at a second-predetermined mixture ratio, and then, generate a luminance signal by adding the high-luminance signal to the low-luminance signal, outputted by a corresponding one of the low-luminance signal generating sections; and a range detecting section to detect a distance to the subject, based on a correlation between luminance signals, each of which is the luminance signal generated by each of the luminance signal generating sections.

(3) According to an image capturing apparatus reflecting still another aspect of the present invention, the image capturing apparatus, comprises: a plurality of imaging elements, each of which converts incident light to electric signals including plural wavelength signals; a plurality of filters, which respectively correspond to the plurality of imaging elements, and each of which separates high frequency components from the plural wavelength signals outputted by a corresponding one of the plurality of imaging elements; and a range detecting section to detect a distance to the subject, based on a correlation of high-luminance signals, each of which is generated by mixing the high frequency components with each other for every one of the plurality of imaging elements.

(4) According to an image capturing method reflecting still another aspect of the present invention, the image capturing method to be implemented by employing a plurality of imaging elements, each of which converts incident light to electric signals including plural wavelength signals, comprises: generating each of plural luminance signals, which respectively correspond to the plurality of imaging elements, by mixing the plural wavelength signals, outputted from a corresponding one of the plurality of imaging elements, with each other at a predetermined mixture ratio; changing a mixture ratio, at which the plural wavelength signals are mixed with each other, based on a positional relationship between a corresponding one of the plurality of imaging elements and a subject, with respect to every one of the plurality of imaging elements; and detecting a distance to the subject, based on a correlation between the plural luminance signals.

(5) According to an image capturing method reflecting still another aspect of the present invention, the image capturing method to be implemented by employing a plurality of imaging elements, each of which converts incident light to electric signals including plural wavelength signals; and a plurality of filters, which respectively correspond to the plurality of imaging elements, and each of which separates high frequency components and low frequency components from the plural wavelength signals outputted by a corresponding one of the plurality of imaging elements, the method comprises: generating each of plural low-luminance signals by mixing the low frequency components, separated by a corresponding one of the plurality of filters, with each other at a first-predetermined mixture ratio; generating each of plural high-luminance signals by mixing the high frequency components, separated by a corresponding one of the plurality of filters, with each other at a second-predetermined mixture ratio; generating each of plural luminance signals, which respectively correspond to the plurality of imaging elements, by adding each of the plural low-luminance signals to a corresponding one of the high-luminance signals; detecting a distance to the subject, based on a correlation between the plural luminance signals.

(6) According to an image capturing method reflecting yet another aspect of the present invention, the image capturing method to be implemented by employing a plurality of imaging elements, each of which converts incident light to electric signals including plural wavelength signals; and a plurality of filters, which respectively correspond to the plurality of imaging elements, and each of which separates high frequency components from the plural wavelength signals outputted by a corresponding one of the plurality of imaging elements, comprises: detecting a distance to a subject, based on a correlation between high-luminance signals, each of which is generated by mixing the high frequency components with each other for every one of the plurality of imaging elements.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

First Embodiment

Figure 1:
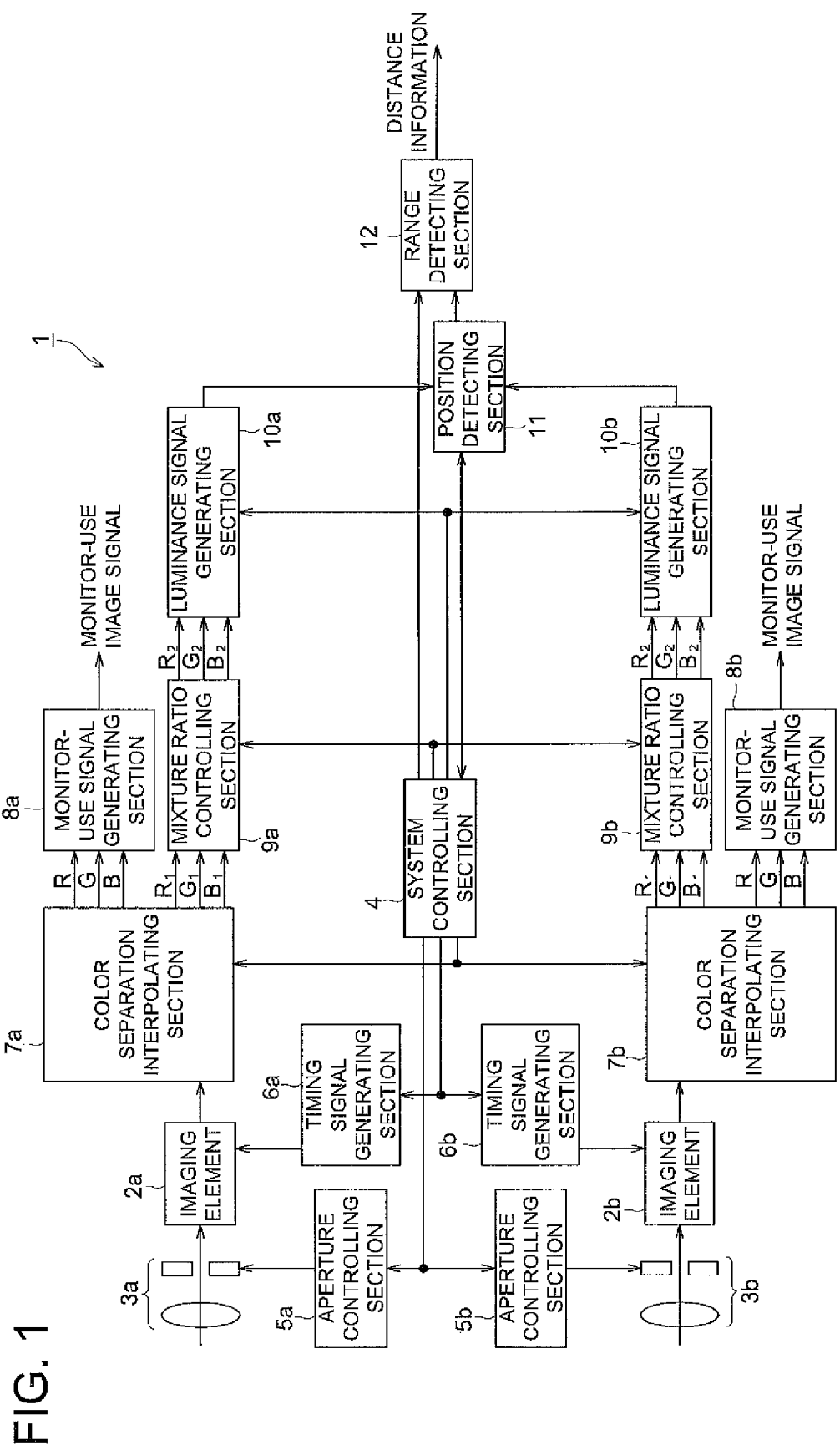
FIG. 1 shows a block diagram indicating an overall configuration of an image capturing apparatus embodied in the present invention as the first embodiment.
Figure 2:
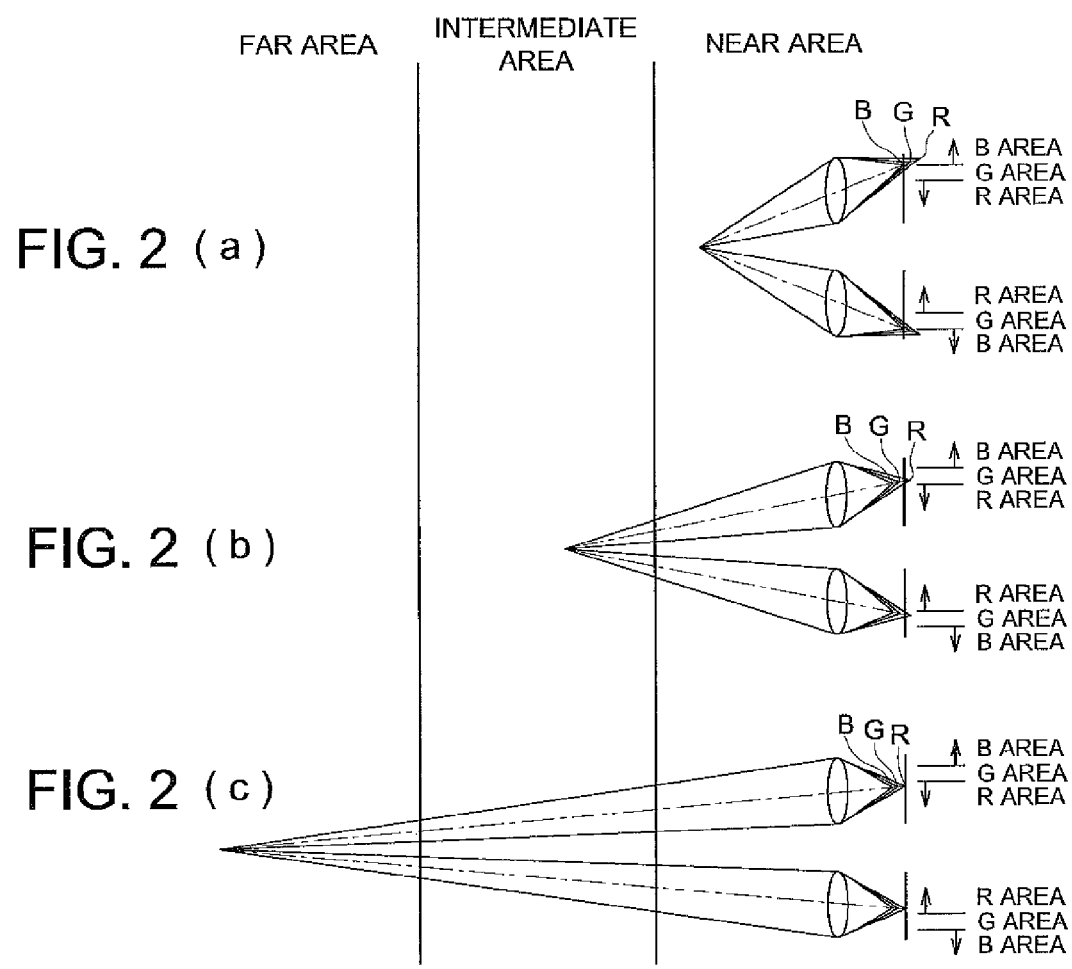
FIG. 2($a$), FIG. 2($b$) and FIG. 2($c$), show various relationships between a subject and an imaging element, embodied in the present invention as the first embodiment.

Referring to FIG. 1 and FIG. 2, a first embodiment of the present invention will be detailed in the following.

As shown in FIG. 1, an image capturing apparatus 1 is provided with two imaging elements 2$a$ and 2$b$ so as to configure a three dimensional camera (3D camera, serving as a stereo camera). The image capturing apparatus 1 is so constituted that two images of the subject are captured by the imaging elements 2a and 2b disposed at different positions, respectively, so as to find a correlation between the captured two images, and then, measures a position (a distance) of the subject on the basis of a parallax between the images of the same subject by using parameters, such as positions of the imaging elements, a focal distance, etc. In this connection, the number of the imaging elements to be provided in the image capturing apparatus 1 is not limited to the abovementioned two elements, it is applicable that the image capturing apparatus 1 is provided with more than two imaging elements.

Further, lens units 3a and 3b, each of which is constituted by a plurality of lenses to focus the subject image onto a focal surface of either the imaging element 2a or 2b and an aperture section to adjust an amount of light condensed by the plurality of lenses, is provided in front of the imaging elements 2a and 2b, respectively.

Still further, each of imaging elements 2a and 2b converts the incident light to electric signals for every one of plural kinds of wavelengths of the incident light. In each of imaging elements 2a and 2b embodied in the present invention, pixels provided with color wavelength filters of R (Red), G (Green), B (Blue) are sequentially and repeatedly aligned in a horizontal direction, so as to output sequentially-repeated signals of the R (Red), G (Green), B (Blue) signals.

Still further, as shown in FIG. 2(a), FIG. 2(b) and FIG. 2(c), corresponding to the focal points of the same subject on the light receiving surface, a light receiving surface of each of the imaging elements 2a and 2b is divided into an R area, a G area and a B area, in the order of distance between the focal points of the same wavelength on the imaging elements 2a and 2b, nearest first. Each of the R area, the G area and the B area varies depending on the position of the subject. For instance, when the subject moves in a left-right direction, the R area, the G area and the B area also sifts in a left-right direction, respectively.

Figure 7:
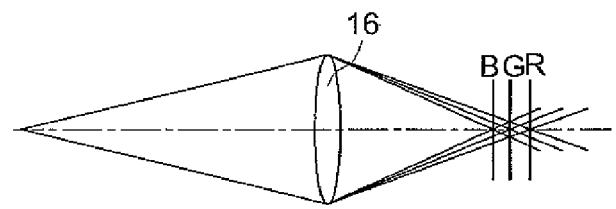
FIG. 7 shows a conceptual schematic diagram indicating a relationship between a fixed focal lens and each of lights having various wavelengths.
Figure 8:
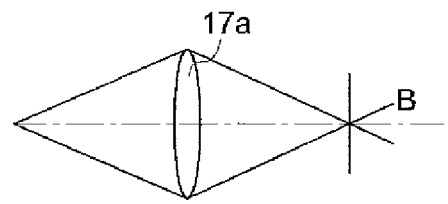
FIG. 8($a$), FIG. 8($b$) and FIG. 8($c$) show conceptual schematic diagrams indicating various relationships between a fixed focal lens and a distance to a subject.
Figure 8:
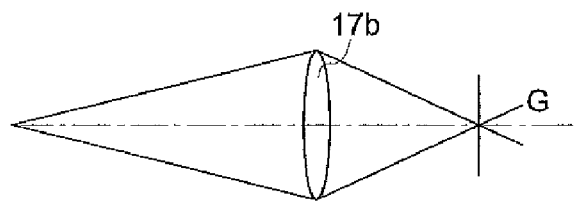
Figure 8:
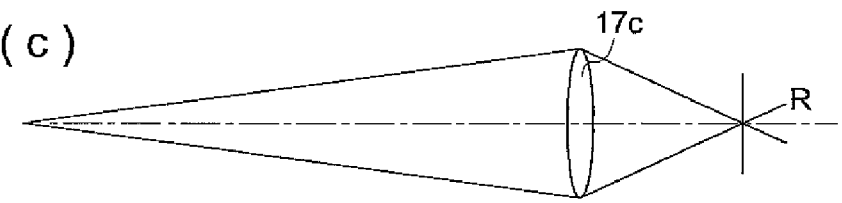

As shown in FIG. 7, when the subject resides at the same position, the position of the focal surface varies depending on the wavelength of the light. Concretely speaking, the position of the focal surface of the B (Blue) light is the nearest to the lens, and the positions of the focal surfaces are getting far from the lens in order of the G (Green) light and the R (Red) light. Accordingly, when compared to the G light, the R light reflected from the subject, located at a farther position compared to the G light, is in focus as shown in FIG. 8(c) and FIG. 8(b), while the B light reflected from the subject, located at a nearer position compared to the G light, is in focus as shown in FIG. 8(a) and FIG. 8(b).

Further, with respect to the imaging elements 2a and 2b that constitutes the 3D camera, the larger the distance between each of the imaging elements 2a, 2b and the subject is, the narrower the positional interval, between positions at which the lights penetrated through the lens units 3a and 3b are in focus, becomes, while the shorter the distance between each of the imaging elements 2a, 2b and the subject is, the wider the positional interval, between positions at which the lights penetrated through the lens units 3a and 3b are in focus, becomes. The interval between imaging elements 2a and 2b is the minimum value of the mutual distance, and is equivalent to the distance between the focal surfaces of both of them when the subject is located at infinitive. In the present embodiment, the light receiving surface of each of the imaging elements 2a and 2b is divided into the areas corresponding to the mutual distance between the focal positions abovementioned. In addition, as aforementioned, each of the areas varies depending on the position of the subject.

As a result of the abovementioned, the R light is in focus most sharply at the R area whose mutual distance between the focal positions on the light receiving surfaces of the imaging elements 2a and 2b is the shortest, while, whose mutual distance between the focal positions is the longest, and the G light is in focus most sharply at the G area whose mutual distance between the focal positions is the intermediate length. In FIG. 2(a), FIG. 2(b) and FIG. 2(c), the B light is in focus at the B area, the G light is in focus at the G area and the R light is in focus at the R area, respectively.

Next, a functional configuration of the image capturing apparatus 1 embodied in the present invention will be detailed in the following. As shown in FIG. 1, the image capturing apparatus 1 is provided with the imaging elements 2a and 2b, in front of which the lens units 3a and 3b are disposed, respectively. The imaging elements 2a and 2b photo-electrically convert the incident light penetrated through the lens units 3a and 3b to electric signals, respectively, so as to acquire image information of the captured image.

A combination of the lenses included in each of the lens units 3a, 3b projects the light reflected from the subject onto the focal surface of corresponding one of the imaging elements 2a, 2b, and at the same time, the aperture section adjusts the amount of light to be Condensed onto the focal surface of corresponding one of the imaging elements 2a, 2b.

Further, the image capturing apparatus 1 is provided with a system controlling section 4. The system controlling section 4 is constituted by a CPU (Central Processing Unit), a RAM (Random Access Memory) provided with semiconductor rewritable memory devices and a ROM (Read Only Memory) provided with nonvolatile semiconductor memory devices.

Still further, various kinds of constituent sections included in the image capturing apparatus 1 are coupled to the system controlling section 4, so that the system controlling section 4 drives and/or controls the various kinds of constituent sections by developing various kinds of processing programs, stored in advance in the ROM, onto the RAM and making the CPU execute the processing programs developed on the RAM.

As shown in FIG. 1, the various kinds of constituent sections, including aperture controlling sections 5a, 5b, timing signal generating sections 6a, 6h, color separation interpolating sections 7a, 7b, monitor-use signal generating sections 8a, 8b, mixture ratio controlling sections 9a, 9b, luminance signal generating sections 10a, 10b, a position detecting section 11 and a range detecting section 12, are electrically coupled to the system controlling section 4.

Each of the aperture controlling sections 5a, 5b drives and controls the aperture section for adjusting the amount of light to be condensed by the corresponding one of the lens units 3a, 3b. Concretely speaking, based on a controlling value inputted from the system controlling section 4, each of the aperture controlling sections 5a, 5b opens the aperture section just before the image capturing operation of the corresponding one of the imaging elements 2a and 2b is commenced, and then, closes the aperture section when a predetermined time has elapsed, while, during the time of deactivating the image capturing operation, the aperture controlling sections 5a, 5b make the aperture section shut off the incident light coming into the each of the imaging elements 2a and 2b.

Each of the timing signal generating sections 6a, 6b generates predetermined timing pulses and outputs the generated timing pulses to the corresponding one of the imaging elements 2a, 2b, so as to control the image capturing operation (such as a charge accumulating operation based on the exposure, an operation for reading accumulated charges) to be conducted in the corresponding one of the imaging elements 2a, 2b.

Each of the color separation interpolating sections 7a, 7b separates each of the R (Red) signal, the G (Green) signal and the B (Blue) signal from the sequentially-repeated signals of the R, G, B signals, and applies the color interpolating operation to each of the wavelength signals (for instance, electric signal of each of B, G, R colors).

Each of the monitor-use signal generating sections 8a, 5b applies various kinds of image processing, such as a black reference correction processing for correcting a black level, serving as a minimum luminance level, to a reference level; an Automatic White Balance (AWB) adjustment processing for adjusting a white balance; a color correction processing for correcting a color component value; a color space conversion processing for converting the color space from the RGB space to the YUV space; etc., to each of the R signal, the G signal and the B signal, outputted from the corresponding one of the color separation interpolating sections 7a, 7b, so as to generate the monitor-use signal.

Each of the mixture ratio controlling sections 9a, 9b changes the mixture ratio of the plurality of wavelength signals with respect to the corresponding one of the imaging elements 2a, 2b, in response to the positional relationship between the subject and the corresponding one of the imaging elements 2a, 2b. Each of the mixture ratio controlling sections 9a, 9b of the present embodiment changes the mixture ratio in such a manner that, when the distance between the subject and the corresponding one of the imaging elements 2a, 2b is great, the ratio of the longer-wavelength signals is increasing, while, when the distance between the subject and the corresponding one of the imaging elements 2a, 2b is small, the ratio of the shorter-wavelength signals is increasing.

Concretely speaking, with reference to the luminance signal $Y_1$ or $Y_2$, each derived by mixing the R signal, the G signal and the B signal at the predetermined mixture ratio, and based on the detected result (the positional relationship between the subject and the imaging element) of the position detecting section 11, each of the mixture ratio controlling sections 9a, 9b makes the ratio of the R signal increase when the distance between the subject and the corresponding one of the imaging elements 2a, 2b is relatively far from each other, while, makes the ratio of the B signal increase when the distance between the subject and the corresponding one of the imaging elements 2a, 2b is relatively near from each other, and makes the ratio of the a signal increase when the distance between the subject and the corresponding one of the imaging elements 2a, 2b is intermediate between far and near above-mentioned.

For this purpose, each of the mixture ratio controlling sections 9a, 9b changes the mixture ratio of the plural wavelength signals by changing the coefficients to be multiply to each of the plural wavelength signals. Concretely speaking, with reference to the luminance signal $Y_1$ or $Y_2=0.3R_1+0.59G_1+0.11B_1$, each of the mixture ratio controlling sections 9a, 9b changes the mixture ratio by replacing the original terms in the above-Equation of the luminance signal $Y_1$ or $Y_2$ with new terms of $R_2$, $Ga_2$, $B_2$, which are derived by multiplying the newly-changed coefficients to the original plural wavelength signals in a multiplying circuit (not shown in the drawings). In this connection, it is applicable that the ratio of any one of the R signal, the C signal and the B signal to be included in the luminance signal $Y_1$ or $Y_2$ is 100%.

Still further, it is also possible for each of the mixture ratio controlling sections 9a, 9b to change the mixture ratio in such a manner that, when the distance between images of the subject, respectively projected onto the imaging elements 2a and 2b, is relatively near from each other, the ratio of the longer-wavelength signals is increasing, while, when the distance between images of the subject, respectively projected onto the imaging elements 2a and 2b, is relatively far from each other, the ratio of the shorter-wavelength signals is increasing.

Namely, it is also possible for each of the mixture ratio controlling sections 9a, 9b to change the mixture ratio of the R signal, the G signal and the B signal, corresponding to a result of detecting on which area among the R area, the G area and the B area, included in the focal surface of the corresponding one of the imaging elements 2a and 2b, the light coming from the subject is in focus. Concretely speaking, when detecting that the image of the subject focuses on the R area, each of the mixture ratio controlling sections 9a, 9b determines that the distance to the subject is relatively far from the focal surface, and accordingly, makes the ratio of the R signal increase, while, when detecting that the image of the subject focuses on the B area, it determines that the distance to the subject is relatively near from the focal surface, and accordingly, makes the ratio of the B signal increase, and further, when detecting that the image of the subject focuses on the G area, it determines that the distance to the subject is intermediate between far and near abovementioned, and accordingly, makes the ratio of the G signal increase.

Further, when the differences between the coefficients of the R signal, the G signal and the B signal are great, each of the mixture ratio controlling sections 9a, 9b establishes switching areas in the vicinity of boundary regions between the areas of the corresponding one of the imaging elements 2a and 2b. It is desirable that each of the coefficients is established, so that the value of the concerned coefficient gradually changes within the boundary region. This makes it possible to suppress the error in the position detecting operation based on the luminance signal $Y_1$ or $Y_2$ acquired in the vicinity of the boundary region between the areas.

As abovementioned, by changing the mixture ratio of each wavelength light so as to make the ratio of the wavelength signal, currently focusing on the subject, increase, it becomes possible to acquire the luminance signal $Y_1$ or $Y_2$ having a high MTF characteristic Concretely speaking, by increasing the ratio of the R signal when the distance between the subject and the corresponding one of the imaging elements 2a, 2b is relatively far from each other, or by increasing the ratio of the B signal when the distance between the subject and the corresponding one of the imaging elements 2a, 2b is relatively near from each other, or by increasing the ratio of the G signal when the distance between the subject and the corresponding one of the imaging elements 2a, 2b is intermediate between far and near abovementioned, it becomes possible to acquire the luminance signal $Y_1$ or $Y_2$ having a high MTF characteristic.

Further, it is also possible for each of the mixture ratio controlling sections 9a, 9b to change the mixture ratio of each wavelength signal for every one of plural subjects focused on the same imaging element. This makes it possible to optimize the mixture ratio of each wavelength signal with respect to the plural subjects residing within a range of the same frame.

Each of the luminance signal generating sections 10a, 10b generates the luminance signal by mixing the plural wavelength signals, outputted by the corresponding one of the imaging elements 2a and 2b, with the predetermined mixture ratio. Each of the luminance signal generating sections 10a, 10b, embodied in the present invention, generates the luminance signal $Y_1$ or $Y_2$, by mixing the R signal, the G signal and the B signal, according to the mixture ratio changed by the corresponding one of the mixture ratio controlling sections 9a, 9b.

The position detecting section 11 detects the positional relationship between the images of the subject, respectively focused on the imaging elements 2a and 2b. Concretely speaking, initially, each of mixture ratio controlling sections 9a, 9b changes the mixture ratio, based on the result detected by the position detecting section 11 (first detected result), and then, each of the luminance signal generating sections 10a, 10b mixes the wavelength signals with the above-changed mixture ratio so as to generate the luminance signals $Y_1$ and $2z$ Successively, the position detecting section 11 detects a relative positional relationship (second detected result) between the images of the same subject, respectively focused on the imaging elements 2a and 2b, by finding the correlation between the luminance signals $Y_1$ and $Y_2$ acquired in the above.

The range detecting section 12 detects the distance to the subject, based on the correlation between the luminance signals $Y_1$ and $Y_2$ acquired for every one of the imaging elements 2a and 2b. Concretely speaking, the range detecting section 12 detects the distance to the subject by deriving from the relative positional relationship between the images of the same subject, respectively focused on the imaging elements 2a and 2b, and by employing various kinds of parameters, such as positions of the imaging elements, a focal length, etc.

Next, the image capturing method employing the image capturing apparatus 1, embodied in the present invention, will be detailed in the following.

When the light coming from the subject passes through the lens units 3a and 3b, and is projected onto the focal surfaces of the imaging elements 2a and 2b, each of the imaging elements 2a and 2b electro-photographically converts the incident light to the electric signals, so as to output the sequentially-repeated signals of R (Red), G (Green), B (Blue) signals.

Successively, each of the color separation interpolating sections 7a, 7b separates each of the R signal, the G signal and the B signal from the sequentially-repeated signals of R (Red), G (Green) B (Blue) signals outputted from the corresponding one of the imaging elements 2a and 2b, and at the same time, applies the color interpolation processing to each of the wavelength signals.

Still successively, each of the monitor-use signal generating sections 8a, 8b applies various kinds of image processing, such as the black reference correction processing, the Automatic White Balance (AWB) adjustment processing, the color correction processing, a color space conversion processing, etc., to each of the R signal, the G signal and the B signal, outputted from the corresponding one of the color separation interpolating sections 7a, 7b, so as to generate the monitor-use signal.

On the other hand, each of the mixture ratio controlling sections 9a, 9b changes the mixture ratio of the R signal, the G signal and the B signal, to be included in the luminance signal $Y_1$ or $Y_2$, corresponding to the distance to the subject.

Concretely speaking, with reference to the luminance signal $Y_1$ or $Y_2=0.3R_1+0.59G_1+0.11B_1$, and based on the result (positional relationship between the imaging element and the subject) detected by the position detecting section 11 (first detected result), each of the mixture ratio controlling sections 9a, 9b changes the mixture ratio of the plural wavelength signals by changing the coefficients to be multiply to each of the plural wavelength signals, so as to make the ratio of the R signal increase when the distance between the subject and the corresponding one of the imaging elements 2a, 2b is relatively far from each other, or to make the ratio of the B signal increase when the distance between the subject and the corresponding one of the imaging elements 2a, 2b is relatively near from each other, or to make the ratio of the G signal increase when the distance between the subject and the corresponding one of the imaging elements 2a, 2b is intermediate between far and near abovementioned.

Further, it is also possible for each of the mixture ratio controlling sections 9a, 9b to change the mixture ratio of the R signal, the G signal and the B signal, corresponding to a result of detecting on which area among the R area, the G area and the B area, included in the focal surface of the corresponding one of the imaging elements 2a and 2b, the light coming from the subject is in focus. In this connection, each of the areas moves in response to the current position of the subject. For instance, when the subject moves in a left-right direction, each of the R area, the C area and the B area also shifts in the left-right direction.

Still successively, each of the luminance signal generating sections 10a, 10b mixes the R signal, the G signal and the B signal with each other, according to the mixture ratio currently changed by the corresponding one of the mixture ratio controlling sections 9a, 9b, so as to generate the corresponding one of the luminance signals.

Still successively, the position detecting section 11 detects the relative positional relationship between the images of the same subject, respectively focused on the imaging elements 2a and 2b, by finding the correlation between the luminance signals $Y_1$, $Y_2$, acquired by the luminance signal generating sections 10a, 10b.

Yet successively, the range detecting section 12 derives the position of the subject (distance to the subject) from the relative positional relationship (second detected result detected by the position detecting section 11) between the images of the same subject respectively focused on the imaging elements 2a and 2b, by employing various kinds of parameters, such as positions of the imaging elements, a focal length, etc.

According to the present embodiment described in the foregoing, by changing the mixture ratio of each of the wavelength signals in response to the positional relationship between the subject and the corresponding one of the imaging elements 2a, 2b so as to utilize such a light that has an optimum wavelength, it becomes possible to perform a high-accurate range finding operation, compared to such a conventional method that employs the luminance signal derived by mixing the wavelength signals with each other merely at a fixed mixture ratio.

Further, by employing the relative positional relationship between the images of the same subject respectively focused on the imaging elements 2a and 2b, it becomes possible to change the mixture ratio of each of the wavelength signals so as to increase an amount of light having an optimum wavelength.

Still further, by changing each of the coefficients to be multiply to each of the plural wavelength signals, it becomes possible to change the mixture ratio of each of the wavelength signals.

Still further, since the light having a long wavelength focuses on the subject located at a distant position, while the light having a short wavelength focuses on the subject located at a near position, by increasing a ratio of the wavelength signal, which is currently in focus, according to the distance to the subject, it becomes possible to acquire the luminance signal having the high MTF characteristic.

Still further, the greater the distance between the subject and each of the imaging elements 2a and 2b is, the narrower the mutual distance between the images of the subject, respectively focused on the imaging elements 2a and 2b, becomes, while the smaller the distance is, the wider the mutual distance becomes. Accordingly, based on this fact, by increasing a ratio of the wavelength signal, which is currently in focus, according to the mutual distance between the images of the subject, it also becomes possible to acquire the luminance signal having the high MTF characteristic.

Still further, with respect to the plural subjects residing within the same frame, it becomes possible to optimize the mixture ratio of each of the wavelength signals.

Yet further, even when the abovementioned wavelength signals are the R signal, the G signal and the B signal, it is possible to achieve the abovementioned features.

Second Embodiment

Figure 3:
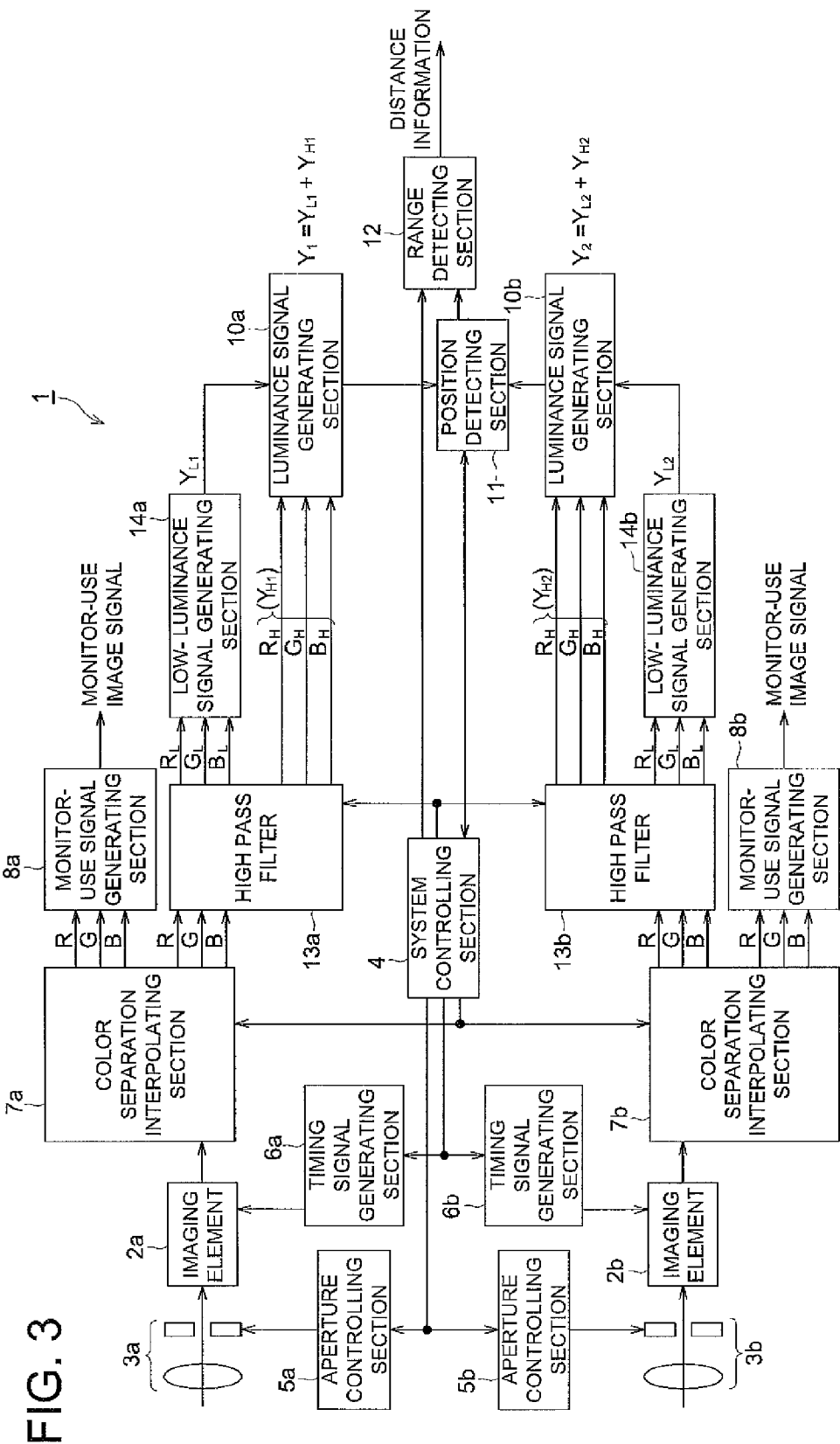
FIG. 3 shows a block diagram indicating an overall configuration of an image capturing apparatus embodied in the present invention as the second embodiment.

Next, referring to FIG. 3, the second embodiment of the present invention will be detailed in the following. In this connection, the same reference number will be attached to the section same as that described in the first embodiment and explanations for them will be omitted. Only the portions being different from the first embodiment will be detailed in the following.

The image capturing apparatus 1, serving as the second embodiment of the present invention, is provided with not only high pass filters 13a, 13b, as a substitute for the mixture ratio controlling sections 9a, 9b, but also low-luminance signal generating sections 14a, 14b.

Since only high frequency components, included in each of the wavelength signals outputted from the color separation interpolating sections 7a, 7b, pass through the high pass filters 13a, 13b, the high frequency components $R_H$, $G_H$, $B_H$ and low frequency components $R_L$, $G_L$, $B_L$ both included in the wavelength signals, can be separated from each other. Then, the high frequency components $R_H$, $G_H$, $D_H$ are outputted to the luminance signal generating sections 10a, 10b, while the low frequency components $R_L$, $G_L$, $B_L$ are outputted to the low-luminance signal generating sections 14a, 14b.

Each of the low-luminance signal generating sections 14a, 14b mixes the low-luminance components of the wavelength signals with each other at a predetermined mixture ratio so as to generate the corresponding one of low-luminance signals $Y_{L1}$, $Y_{L2}$. In this connection, hereinafter, the predetermined mixture ratio abovementioned is defined as a predetermined and fixed mixture ratio. In the second embodiment of the present invention, the mixture ratio of the luminance signal $Y_1$ or $Y_2=0.3R_1+0.59G_1+0.11B_1$, serving as the aforementioned reference, is established as the predetermined mixture ratio, and each of the low-luminance signals $Y_{L1}$, $Y_{L2}$ is generated by mixing the low frequency components with each other, each of which is derived by multiplying a predetermined coefficient in a multiplying circuit (not shown in the drawings). Then, each of the low-luminance signals $Y_{L1}$, $Y_{L2}$ is outputted to the corresponding one of the luminance signal generating sections 10a, 10b.

Further, each of the luminance signal generating sections 10a, 10b generates a corresponding one of high-luminance signals $Y_{H1}$, $Y_{H2}$ by mixing the high frequency components of the wavelength signals with each other, and adds the high-luminance signals $Y_{H1}$, $Y_{H2}$ to the low-luminance signals $Y_{L1}$, $Y_{L2}$ so as to generate the luminance signals $Y_1$, $Y_2$, respectively.

As abovementioned, each of the luminance signal generating sections 10a, 10b generates the corresponding one of the high-luminance signals $Y_{H1}$, $Y_{H2}$ by mixing the high frequency components of the wavelength signals with each other, as it is (alternatively, by mixing them at the predetermined mixture ratio). Accordingly, with respect to the high frequency components, since only the light, having the wavelength that makes the subject in focus, remains among the high frequency components included in each of the wavelength signals, it becomes possible to acquire the high-luminance signals $Y_{H1}$, $Y_{H2}$, in each of which the ratio of the wavelength signal that makes the subject in focus is increased, only by employing the high pass filters 13a, 13b for separating the high-luminance signals. Concretely speaking, the ratio of the R signal increases when the distance between the subject and the corresponding one of the imaging elements 2a, 2b is relatively far from each other, while the ratio of the B signal increases when the distance between the subject and the corresponding one of the imaging elements 2a, 2b is relatively near from each other, and the ratio of the G signal increases when the distance between the subject and the corresponding one of the imaging elements 2a, 2b is intermediate between far and near abovementioned. This makes it possible to acquire the luminance signal $Y_1$ or $Y_2$ having the high MTF characteristic.

Further, since the high frequency components and the low frequency components are respectively separated from each of the wavelength signals, and then, the low frequency components are mixed with each other at a fixed mixture ratio irrespective of the distance to the subject, it becomes possible to maintain a color reproduce-ability of an image to be displayed on the monitor, even when the luminance signal to be used for the positional detecting operation is also employed as the monitor-use signal.

Next, the image capturing method of the present invention, employing the image capturing apparatus 1 embodied in the present invention, will be detailed in the following.

Since only high frequency components, included in each of the wavelength signals outputted from the color separation interpolating sections 7a, 7b, pass through the high pass filters 13a, 13b, the high frequency components and the low frequency components, both included in each of the wavelength signals, can be separated from each other. Then, the high frequency components are outputted to the luminance signal generating sections 10a, 10b, while the low frequency components are outputted to the low-luminance signal generating sections 14a, 14b.

Successively, each of the low-luminance signal generating sections 14a, 14b mixes the low-luminance components of the wavelength signals with each other at the predetermined mixture ratio so as to generate the corresponding one of the low-luminance signals $Y_{L1}$, $Y_{L2}$, and outputs the generated low-luminance signals $Y_{L1}$, $Y_{L2}$ to the luminance signal generating sections 10a, 10b, respectively.

Still successively, each of the luminance signal generating sections 10a, 10b generates a corresponding one of the high-luminance signals $Y_{H1}$, $Y_{H2}$ from the high frequency components of each of the wavelength signals, which are separated by the corresponding one of the high pass filters 13a, 13b, and adds the high-luminance signals $Y_{H1}$, $Y_{H2}$ to the low-luminance signals $Y_{L1}$, $Y_{L2}$ so as to generate the luminance signals $Y_1$, $Y_2$, respectively. At this time, each of the luminance signal generating sections 10a, 10b generates the corresponding one of the high-luminance signals $Y_{H1}$, $Y_{H2}$ by mixing the high frequency components of each of the wavelength signals with each other, as it is.

According to the embodiment of the present invention, described in the foregoing, with respect to the high frequency components, since only the light, having the wavelength that makes the subject in focus, remains among the high frequency components included in each of the wavelength signals, it becomes possible to acquire the high-luminance signals $Y_{H1}$, $Y_{H2}$, in each of which the ratio of the wavelength signal that makes the subject in focus is increased, only by employing the high pass filters 13a, 13b for separating the high-luminance signals. This makes it possible to achieve a highly accurate range finding operation, by employing the high-luminance signals $Y_{H1}$, $Y_{H2}$ having the high MTF characteristic.

Further, since the high frequency components and the low frequency components are respectively separated from each of the wavelength signals, and then, the low frequency components are mixed with each other at a fixed mixture ratio irrespective of the distance to the subject, it becomes possible to maintain a color reproduce-ability of an image to be displayed on the monitor, even when the luminance signal to be used for the positional detecting operation is also employed as the monitor-use signal.

Still further, by multiplying the coefficients to the low frequency components for every one of the plural wavelength signals, it becomes possible to mix the low frequency components with each other at a predetermined mixture ratio.

Third Embodiment

Figure 4:
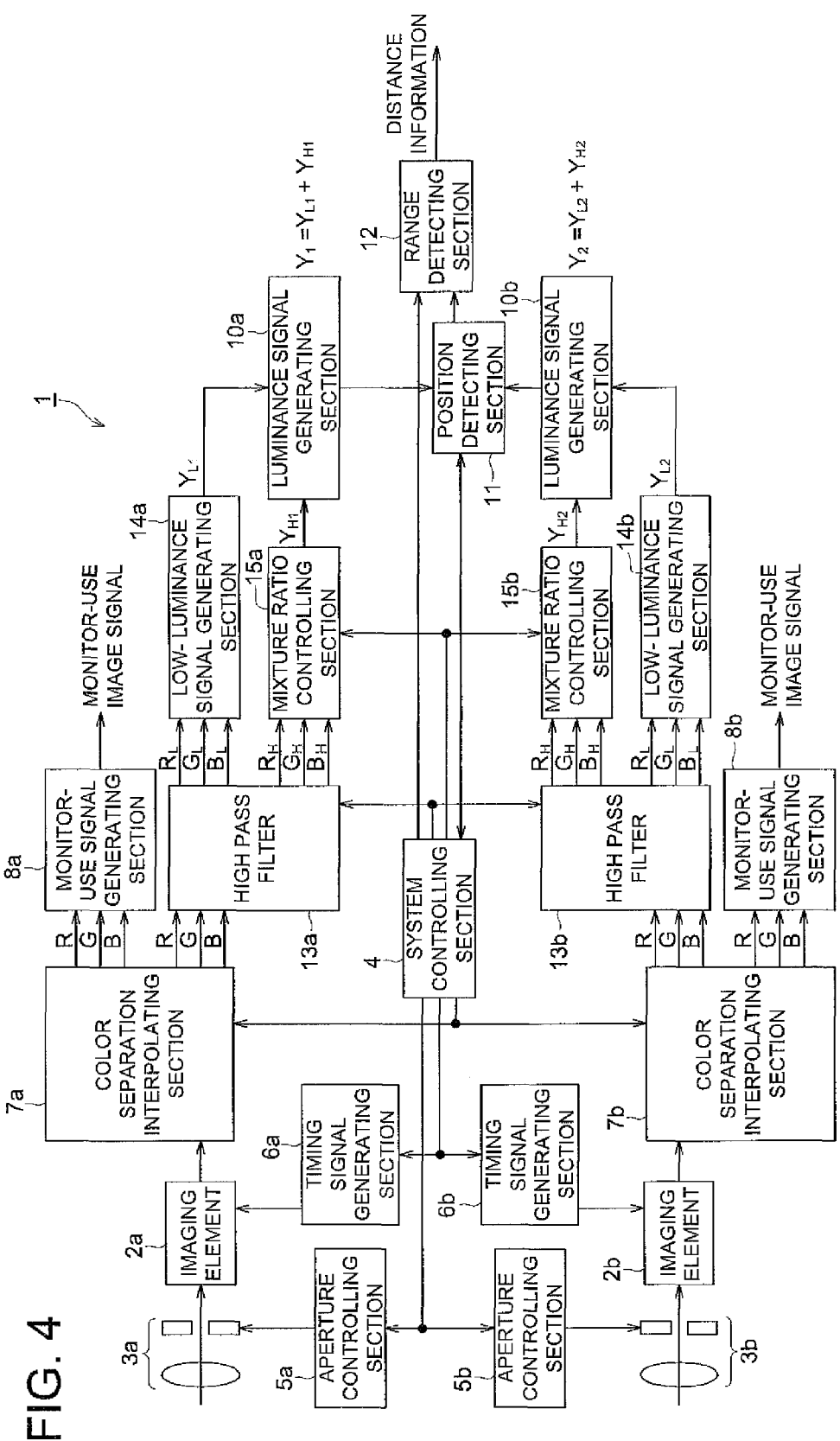
FIG. 4 shows a block diagram indicating an overall configuration of an image capturing apparatus embodied in the present invention as the third embodiment.

Next, referring to FIG. 4, the third embodiment of the present invention will be detailed in the following. In this connection, the same reference number will be attached to the section same as that described in the second embodiment and explanations for them will be omitted. Only the portions being different from the second embodiment will be detailed in the following.

The image capturing apparatus 1, embodied in the present invention as the third embodiment, is provided with mixture ratio controlling sections 15a, 15b, in addition to the high pass filters 13a, 13b and the low-luminance signal generating sections 14a, 14b.

Each of the mixture ratio controlling sections 15a, 15b changes the mixture ratio of the high frequency components of each of the wavelength signals in response to the distance to the subject. In the third embodiment, each of the mixture ratio controlling sections 15a, 15b changes the mixture ratio in such a manner that, when the distance between the subject and the corresponding one of the imaging elements 2a, 2b is great, the ratio of the longer-wavelength signals is increasing, while, when the distance between the subject and the corresponding one of the imaging elements 2a, 2b is small, the ratio of the shorter-wavelength signals is increasing.

Concretely speaking, with reference to the high-luminance signals, each derived by mixing the R signal, the G signal and the B signal at the predetermined mixture ratio, and based on the result detected by the position detecting section 11, each of the mixture ratio controlling sections 15a, 15b makes the ratio of the R signal increase when the distance between the subject and the corresponding one of the imaging elements 2a/2b is relatively far from each other, while, makes the ratio of the B signal increase when the distance between the subject and the corresponding one of the imaging elements 2a, 2b is relatively near from each other, and makes the ratio of the G signal increase when the distance between the subject and the corresponding one of the imaging elements 2a, 2b is intermediate between far and near abovementioned.

Further, each of the mixture ratio controlling sections 15a, 15b changes the mixture ratio by changing the coefficients to be respectively multiply to the wavelength signals of the high-luminance signals in a multiplying circuit (not shown in the drawings).

Still further, it is also possible for each of the mixture ratio controlling sections 15a, 15b to change the mixture ratio in such a manner that, when the distance between images of the subject, respectively projected onto the imaging elements 2a and 2b, is relatively near from each other, the ratio of the longer-wavelength signals is increasing, while, when the distance between images of the subject, respectively projected onto the imaging elements 2a and 2b, is relatively far from each other, the ratio of the shorter-wavelength signals is increasing.

Namely, it is also possible for each of the mixture ratio controlling sections 15a, 15b to change the mixture ratio of the R signal, the G signal and the B signal, corresponding to a result of detecting on which area among the R area, the C area and the B area, included in the focal surface of the corresponding one of the imaging elements 2a and 2b, the light coming from the subject is in focus.

According to the abovementioned feature, only by separating the high frequency components with the high pass filters 13a, 13b, as aforementioned, it becomes possible to acquire the high-luminance signals $Y_{H1}$, $Y_{H2}$, in each of which the ratio of wavelength signals that focus the subject is increasing. Further, in addition to the above, by changing the mixture ratio of the light of each wavelength, it also becomes possible to acquire the high-luminance signals $Y_{H1}$, $Y_{H2}$, each having a high MTF characteristic higher than ever.

Yet further, each of the luminance signal generating sections 10a, 10b generates a corresponding one of the high-luminance signals $Y_{H1}$, $Y_{H2}$ by mixing the high frequency components of each of the wavelength signals, according to the mixture ratio changed by the corresponding one of the mixture ratio controlling sections 15a, 15b, and adds the high-luminance signals $Y_{H1}$, $Y_{H2}$ to the low-luminance signals $Y_{L1}$, $Y_{L2}$ so as to generate the luminance signals $Y_1$, $Y_2$, respectively.

Next, the image capturing method of the present invention, employing the image capturing apparatus 1 embodied in the present invention, will be detailed in the following.

After each of the high pass filters 13a, 13b separates the high frequency components and the low frequency components from each of the wavelength signals, each of the mixture ratio controlling sections 15a, 15b changes the mixture ratio of the high frequency components of each of the wavelength signals, corresponding to the distance to the subject. Based on the result detected by the position detecting section 11, each of the mixture ratio controlling sections 15a, 15b makes the ratio of the R signal increase when the distance between the subject and the corresponding one of the imaging elements 2a, 2b is relatively far from each other, while, makes the ratio of the B signal increase when the distance between the subject and the corresponding one of the imaging elements 2a, 2b is relatively near from each other, and makes the ratio of the G signal increase when the distance between the subject and the corresponding one of the imaging elements 2a, 2b is intermediate between far and near abovementioned.

On the other hand, each of the low-luminance signal generating sections 14a, 14b mixes the low-luminance components of the wavelength signals with each other at the predetermined mixture ratio so as to generate the corresponding one of the low-luminance signals $Y_{L1}$, $Y_{L2}$, and outputs the generated low-luminance signals $Y_{L1}$, $Y_{L2}$, to the luminance signal generating sections 10a, 10b, respectively.

Successively, each of the luminance signal generating sections 10a, 10b generates a corresponding one of the high-luminance signals $Y_{H1}$, $Y_2$ by mixing the high frequency components of each of the wavelength signals, according to the mixture ratio changed by the corresponding one of the mixture ratio controlling sections 15a, 15b, and adds the high-luminance signals $Y_{H1}$, $Y_{H2}$ to the low-luminance signals $Y_{L1}$, $Y_{L2}$ so as to generate the luminance signals $Y_1$, $Y_2$, respectively.

According to the embodiment of the present invention, described in the foregoing, by employing the high pass filters 13a, 13b for separating the high frequency components from the wavelength signals, and by changing the mixture ratio of the high frequency components corresponding to the distance to the subject, it becomes possible to acquire the high-luminance signals $Y_{H1}$, $Y_{H2}$ having the high MTF characteristic so as to achieve a highly accurate range finding operation.

Further, by employing the relative positional relationship between the images of the subject, respectively projected onto each of the imaging elements 2a and 2b, it becomes possible to change the mixture ratio of each of the wavelength signals so as to increase an amount of the light having an optimum wavelength.

Still further, by changing the coefficients to be respectively multiply to the high frequency components of each of the plural wavelength signals, it becomes possible to change the mixture ratio of the high frequency components in the high-luminance signals.

Still further, since the light having a long wavelength focuses on the subject located at a distant position, while the light having a short wavelength focuses on the subject located at a near position, by increasing a ratio of the low frequency components included in the wavelength signal, which is currently in focus, according to the distance to the subject, it becomes possible to acquire the luminance signal having the high MTF characteristic.

Yet further, the greater the distance between the subject and each of the imaging elements 2a and 2b is, the narrower the mutual distance between the images of the subject, respectively focused on the imaging elements 2a and 2b, becomes, while the smaller the distance is, the wider the mutual distance becomes. Accordingly, by increasing a ratio of the wavelength signal, which is currently in focus, according to the mutual distance between the images of the subject, it also becomes possible to acquire the luminance signal having the high MTF characteristic.

Fourth Embodiment

Figure 5:
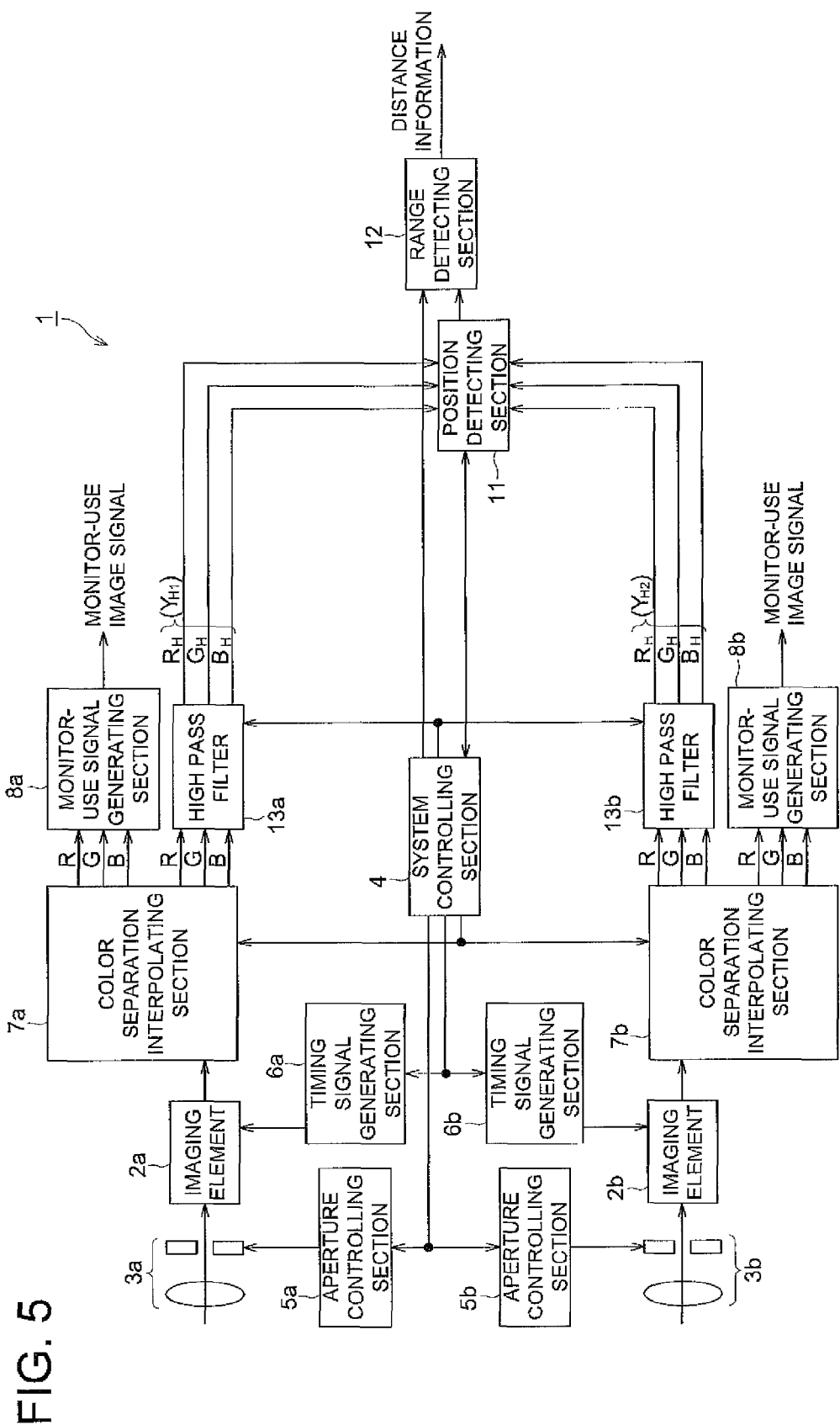
FIG. 5 shows a block diagram indicating an overall configuration of an image capturing apparatus embodied in the present invention as the fourth embodiment.

Next, referring to FIG. 5, the fourth embodiment of the present invention will be detailed in the following. In this connection, the same reference number will be attached to the section same as that described in the second embodiment and explanations for them will be omitted. Only the portions being different from the second embodiment will be detailed in the following.

As well as the second embodiment, the image capturing apparatus 1, serving as the forth embodiment of the present invention, is provided with the high pass filters 13a, 13b, as a substitute for the mixture ratio controlling sections 9a, 9b. However, the image capturing apparatus 1 is not provided with the low-luminance signal generating sections 14a, 14b and the luminance signal generating sections 10a, 10b.

Each of the high pass filters 13a, 13b separates only the high frequency components, included in each of the wavelength signals outputted from the color separation interpolating sections 7a, 7b, and output the separated high frequency components to the position detecting section 11.

Accordingly, with respect to the high frequency components, since only the light, having the wavelength that makes the subject in focus, remains among the high frequency components included in each of the wavelength signals as above-mentioned, it becomes possible to acquire the high-luminance signals $Y_{H1}$, $Y_{H2}$, each having the mixture ratio corresponding to the distance to the subject, only by employing the high pass filters 13a, 13b for separating the high-luminance signals.

Still successively, the position detecting section 11 detects the relative positional relationship between the images of the same subject, respectively focused on the imaging elements 2a and 2b, based on the correlation between the high-luminance signals $Y_{H1}$, $Y_{H2}$ each acquired by mixing the high frequency components in respect to the corresponding one of the imaging elements 2a and 2b.

Next, the image capturing method of the present invention, employing the image capturing apparatus 1 embodied in the present invention, will be detailed in the following.

After each of the high pass filters 13a, 13b separates only the high frequency components from each of the wavelength signals, the position detecting section 11 detects the relative positional relationship between the images of the same subject, respectively focused on the imaging elements 2a and 2b, by finding the correlation between the high-luminance signals $Y_1$, $Y_{H2}$, each acquired by mixing the high frequency components in respect to the corresponding one of the imaging elements 2a and 2b.

According to the embodiment of the present invention, described in the foregoing, with respect to the high frequency components, since only the light, having the wavelength that makes the subject in focus, remains among the high frequency components included in each of the wavelength signals, it becomes possible to acquire the high-luminance signals, in each of which the ratio of the wavelength signal that makes the subject in focus is increased, only by employing the high pass filters 13a, 13b for separating only the high-luminance signals. This makes it possible to achieve a highly accurate range finding operation, by employing the high-luminance signals having the high MTF characteristic.

Further, since the high frequency components and the low frequency components are respectively separated from each of the wavelength signals, and then, the low frequency components are mixed with each other at a fixed mixture ratio irrespective of the distance to the subject, it becomes possible to maintain a color reproduce-ability of an image to be displayed on the monitor, even when the luminance signal to be used for the positional detecting operation is also employed as the monitor-use signal.

Fifth Embodiment

Figure 6:
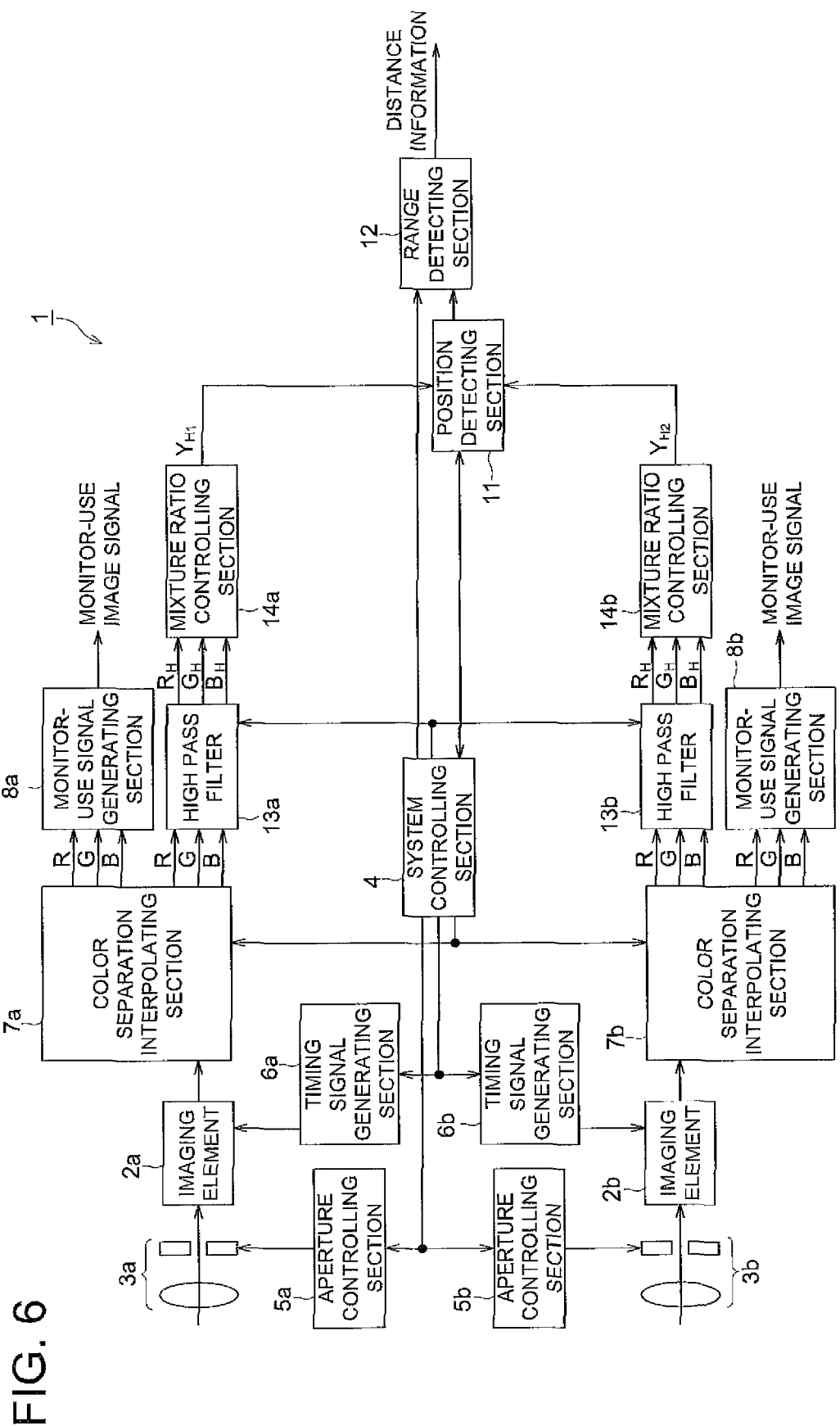
FIG. 6 shows a block diagram indicating an overall configuration of an image capturing apparatus embodied in the present invention as the fifth embodiment.

Next, referring to FIG. 6, the fifth embodiment of the present invention will be detailed in the following. In this connection, the same reference number will be attached to the section same as that described in the fourth embodiment and explanations for them will be omitted. Only the portions being different from the fourth embodiment will be detailed in the following.

The image capturing apparatus 1, embodied in the present invention as the fifth embodiment, is provided with the mixture ratio controlling sections 15a, 15b, in addition to the high pass filters 13a, 13b.

As well as the abovementioned third embodiment, each of the mixture ratio controlling sections 15a, 15b changes the mixture ratio of the high frequency components of each of the wavelength signals in response to the distance to the subject. In the fifth embodiment, each of the mixture ratio controlling sections 15a, 15b changes the mixture ratio in such a manner that, when the distance between the subject and the corresponding one of the imaging elements 2a, 2b is great, the ratio of the longer-wavelength signals is increasing, while, when the distance between the subject and the corresponding one of the imaging elements 2a, 2b is small, the ratio of the shorter-wavelength signals is increasing.

Further, it is also possible for each of the mixture ratio controlling sections 15a, 15b to change the mixture ratio in such a manner that, when the distance between images of the subject, respectively projected onto the imaging elements 2a and 2b, is relatively near from each other, the ratio of the longer-wavelength signals is increasing, while, when the distance between images of the subject, respectively projected onto the imaging elements 2a and 2b, is relatively far from each other, the ratio of the shorter-wavelength signals is increasing.

According to the abovementioned feature, only by separating the high frequency components with the high pass filters 13a, 13b, as aforementioned, it becomes possible to acquire the high-luminance signals $Y_{H1}$, $Y_{H2}$, in each of which the ratio of wavelength signals that focus the subject is increasing. Further, in addition to the above, by changing the mixture ratio of the light of each wavelength, it also becomes possible to acquire the high-luminance signals $Y_{H1}$, $Y_{H2}$, each having a high MTF characteristic higher than ever.

Still further, the position detecting section 11 detects the relative positional relationship between the images of the same subject, respectively focused on the imaging elements 2a and 2b, based on the correlation between the high-luminance signals $Y_{H1}$, $Y_{H2}$, each acquired by mixing the high frequency components in respect to the corresponding one of the imaging elements 2a and 2b, according to the mixture ratio changed by the corresponding one of the mixture ratio controlling sections 15a, 15b.

Next, the image capturing method of the present invention, employing the image capturing apparatus 1 embodied in the present invention, will be detailed in the following.

After each of the high pass filters 13a, 13b separates only the high frequency components from each of the wavelength signals, each of the mixture ratio controlling sections 15a, 15b changes the mixture ratio of the high frequency components of each of the wavelength signals, corresponding to the distance to the subject.

Successively, the position detecting section 11 detects the relative positional relationship between the images of the same subject, respectively focused on the imaging elements 2a and 2b, based on the correlation between the high-luminance signals $Y_{H1}$, $Y_{H2}$, each acquired by mixing the high frequency components in respect to the corresponding one of the imaging elements 2a and 2b, according to the mixture ratio changed by the corresponding one of the mixture ratio controlling sections 15a, 15b.

According to the embodiment of the present invention, described in the foregoing, by employing the high pass filters 13a, 13b for separating the high frequency components from the wavelength signals, and by changing the mixture ratio of the high frequency components corresponding to the distance to the subject, it becomes possible to acquire the high-luminance signals $Y_{H1}$, $Y_{H2}$ having the high MTF characteristic so as to achieve a highly accurate range finding operation.

Further, since the light having a long wavelength focuses on the subject located at a distant position, while the light having a short wavelength focuses on the subject located at a near position, by increasing a ratio of the low frequency components included in the wavelength signal, which is currently in focus, according to the distance to the subject, it becomes possible to acquire the luminance signal having the high MTF characteristic.

Yet further, the greater the distance between the subject and each of the imaging elements 2a and 2b is, the narrower the mutual distance between the images of the subject, respectively focused on the imaging elements 2a and 2b, becomes, while the smaller the distance is, the wider the mutual distance becomes. Accordingly, by increasing a ratio of the wavelength signal, which is currently in focus, according to the mutual distance between the images of the subject, it also becomes possible to acquire the luminance signal having the high MTF characteristic.

As described in the foregoing, according to the image capturing apparatus and the image capturing method embodied in the present invention, in an image capturing apparatus and an image capturing method, both employing a plurality of imaging elements, it becomes possible to perform a highly accurate range finding operation irrespective a current position of the subject.

Further, according to the present invention, the following effects can be attained.

(1) It becomes possible to conduct a high accurate range finding operation irrespective a current position of the subject.

(2) It becomes possible to change the mixture ratio of each of wavelength signals so as to increase the light having an optimum wavelength.

(3) By changing coefficients to be respectively multiplied to the plurality of wavelength signals, it becomes possible to change the mixture ratio of each of wavelength signals.

(4) It becomes possible not only to acquire the high-luminance signal, in which the ratio of the high frequency components being suitable for the subject is increased and which has a higher MTF characteristic, but also to conduct a high accurate range finding operation.

(5) With respect to a plurality of subjects residing within the same frame, it becomes possible to optimize the mixture ratio of each of the wavelength signals.

(6) It becomes possible to maintain a color reproduce-ability of an image to be displayed on the monitor, even when the luminance signal to be used for the positional detecting operation is also employed as the monitor-use signal.

(7) It becomes possible to change the mixture ratio of each of the wavelength signals so as to increase the light having an optimum wavelength.

(8) Even when the plural wavelength signals are a Red signal, a Green signal and a Blue signal, it is possible to achieve the effects and actions mentioned in the foregoing.

While the preferred embodiments of the present invention have been described using specific term, such description is for illustrative purpose only, and it is to be understood that changes and variations may be made without departing from the spirit and scope of the appended claims.

The invention claimed is:

1. An image capturing apparatus, comprising:
   a plurality of imaging elements, each of which converts incident light to electric signals including plural wavelength signals;
   a plurality of luminance signal generating sections, which respectively correspond to the plurality of imaging elements, and each of which generates a luminance signal by mixing the plural wavelength signals, outputted from a corresponding one of the plurality of imaging elements, with each other at a predetermined mixture ratio;
   a plurality of mixture ratio controlling sections, which respectively correspond to the plurality of imaging elements, and each of which changes a mixture ratio, at which the plural wavelength signals are mixed with each other, based on a positional relationship between a corresponding one of the plurality of imaging elements and a subject; and
a range detecting section to detect a distance to the subject, based on a correlation between luminance signals, each of which is the luminance signal generated by each of the luminance signal generating sections.

2. The image capturing apparatus of claim 1, further comprising:
a position detecting section to detect a relative positional relationship between images of the subject, which are respectively projected onto the plurality of imaging elements;
wherein each of the mixture ratio controlling sections changes the mixture ratio, corresponding to the relative positional relationship detected by the position detecting section.

3. The image capturing apparatus of claim 1,
wherein each of the mixture ratio controlling sections changes the mixture ratio, by changing coefficients to be respectively multiplied to the plural wavelength signals.

4. The image capturing apparatus of claim 1,
wherein each of the mixture ratio controlling sections changes the mixture ratio in such a manner that, when a distance between the subject and a corresponding one of the plurality of imaging elements is far, a ratio of longer-wavelength signals is increasing, while, when the distance between the subject and a corresponding one of the plurality of imaging elements is near, a ratio of shorter-wavelength signals is increasing.

5. The image capturing apparatus, of claim 1,
wherein each of the mixture ratio controlling sections changes the mixture ratio in such a manner that, when a distance between images of the subject, respectively projected onto the plurality of imaging elements, is relatively near from each other, a ratio of longer-wavelength signals is increasing, while, when the distance between the images of the subject, respectively projected onto the plurality of imaging elements, is relatively far from each other, a ratio of shorter-wavelength signals is increasing.

6. The image capturing apparatus of claim 1,
wherein each of the mixture ratio controlling sections changes the mixture ratio for every one of plural subjects projected onto a corresponding one of the plurality of imaging elements.

7. The image capturing apparatus of claim 1,
wherein the plural wavelength signals includes a Red signal, a Green signal and a Blue signal.

8. An image capturing apparatus, comprising:
a plurality of imaging elements, each of which converts incident light to electric signals including plural wavelength signals;
a plurality of filters, which respectively correspond to the plurality of imaging elements, and each of which separates high frequency components and low frequency components from the plural wavelength signals outputted by a corresponding one of the plurality of imaging elements;
a plurality of low-luminance signal generating sections, which respectively correspond to the plurality of imaging elements, and each of which generates a low-luminance signal by mixing the low frequency components with each other at a first-predetermined mixture ratio;
a plurality of luminance signal generating sections, which respectively correspond to the plurality of imaging elements, and each of which generates a high-luminance signal by mixing the high frequency components with each other at a second-predetermined mixture ratio, and then, generate a luminance signal by adding the high-luminance signal to the low-luminance signal, outputted by a corresponding one of the low-luminance signal generating sections; and
a range detecting section to detect a distance to the subject, based on a correlation between luminance signals, each of which is the luminance signal generated by each of the luminance signal generating sections.

9. The image capturing apparatus of claim 8,
wherein each of the low-luminance signal generating sections establishes a combination of coefficients, to be respectively multiplied to the low frequency components, as the first-predetermined mixture ratio.

10. The image capturing apparatus of claim 8, further comprising:
a position detecting section to detect a relative positional relationship between images of the subject, which are respectively projected onto the plurality of imaging elements; and
a plurality of mixture ratio controlling sections, which respectively correspond to the plurality of imaging elements, and each of which changes a mixture ratio of the high frequency components corresponding to a result detected by the position detecting section.

11. The image capturing apparatus of claim 10,
wherein each of the mixture ratio controlling sections changes the mixture ratio in such a manner that, when a distance between a corresponding one of the plurality of imaging elements and the subject is far, a ratio of high frequency components of longer-wavelength signals is increasing, while, when the distance between a corresponding one of the plurality of imaging elements and the subject is near, a ratio of high frequency components of shorter-wavelength signals is increasing.

12. The image capturing apparatus of claim 10,
wherein each of the mixture ratio controlling sections changes the mixture ratio in such a manner that, when a distance between images of the subject, respectively projected onto the plurality of imaging elements, is relatively near from each other, a ratio of high frequency components of longer-wavelength signals is increasing, while, when the distance between the images of the subject, respectively projected onto the plurality of imaging elements, is relatively far from each other, a ratio of high frequency components of shorter-wavelength signals is increasing.

13. The image capturing apparatus of claim 10,
wherein each of the mixture ratio controlling sections changes the mixture ratio by changing coefficients to be respectively multiplied to the high frequency components.

14. The image capturing apparatus of claim 10,
wherein each of the mixture ratio controlling sections changes the mixture ratio for every one of plural subjects projected onto a corresponding one of the plurality of imaging elements.

15. The image capturing apparatus of claim 8,
wherein the plural wavelength signals includes a Red signal, a Green signal and a Blue signal.

16. An image capturing apparatus, comprising:
a plurality of imaging elements, each of which converts incident light to electric signals including plural wavelength signals;
a plurality of filters, which respectively correspond to the plurality of imaging elements, and each of which separates high frequency components from the plural wavelength signals outputted by a corresponding one of the plurality of imaging elements; and a range detecting section to detect a distance to the subject, based on a correlation of high-luminance signals, each of which is generated by mixing the high frequency components with each other for every one of the plurality of imaging elements.

17. The image capturing apparatus, recited in claim 6, characterized in that a position detecting section to detect a relative positional relationship between images of the subject, respectively projected onto the plurality of imaging elements; and a mixture ratio controlling section to change a mixture ratio of the high frequency components, corresponding to a result detected by the position detecting section.

18. The image capturing apparatus of claim 17, wherein each of the mixture ratio controlling sections changes the mixture ratio in such a manner that, when a distance between a corresponding one of the plurality of imaging elements and the subject is far, a ratio of high frequency components of longer-wavelength signals is increasing, while, when the distance between a corresponding one of the plurality of imaging elements and the subject is near, a ratio of high frequency components of shorter-wavelength signals is increasing.

19. The image capturing apparatus of claim 17, wherein each of the mixture ratio controlling sections changes the mixture ratio in such a manner that, when a distance between images of the subject, respectively projected onto the plurality of imaging elements, is relatively near from each other, a ratio of high frequency components of longer-wavelength signals is increasing, while, when the distance between the images of the subject, respectively projected onto the plurality of imaging elements, is relatively far from each other, a ratio of high frequency components of shorter-wavelength signals is increasing.

20. The image capturing apparatus of claim 16, wherein each of the mixture ratio controlling sections changes the mixture ratio for every one of plural subjects projected onto a corresponding one of the plurality of imaging elements.

21. The image capturing apparatus of claim 16, wherein the plural wavelength signals includes a Red signal, a Green signal and a Blue signal.

22. An image capturing method to be implemented by employing a plurality of imaging elements, each of which converts incident light to electric signals including plural wavelength signals, comprising:

generating each of plural luminance signals, which respectively correspond to the plurality of imaging elements, by mixing the plural wavelength signals, outputted from a corresponding one of the plurality of imaging elements, with each other at a predetermined mixture ratio;

changing a mixture ratio, at which the plural wavelength signals are mixed with each other, based on a positional relationship between a corresponding one of the plurality of imaging elements and a subject, with respect to every one of the plurality of imaging elements; and detecting a distance to the subject, based on a correlation between the plural luminance signals.

23. The image capturing method of claim 22, further comprising:

detecting a relative positional relationship between images of the subject, which are respectively projected onto the plurality of imaging elements;

wherein the mixture ratio is changed corresponding to the relative positional relationship detected in the detecting step.

24. The image capturing method of claim 22, wherein the mixture ratio is changed by changing coefficients to be respectively multiplied to the plural wavelength signals.

25. The image capturing method of claim 22, wherein the mixture ratio is changed in such a manner that, when a distance between the subject and a corresponding one of the plurality of imaging elements is far, a ratio of longer-wavelength signals is increasing, while, when the distance between the subject and a corresponding one of the plurality of imaging elements is near, a ratio of shorter-wavelength signals is increasing.

26. The image capturing method of claim 22, wherein the mixture ratio is changed in such a manner that, when a distance between images of the subject, respectively projected onto the plurality of imaging elements, is relatively near from each other, a ratio of longer-wavelength signals is increasing, while, when the distance between the images of the subject, respectively projected onto the plurality of imaging elements, is relatively far from each other, a ratio of shorter-wavelength signals is increasing.

27. The image capturing method of claim 22, wherein the mixture ratio is changed for every one of plural subjects projected onto a corresponding one of the plurality of imaging elements.

28. The image capturing method of claim 22, wherein the plural wavelength signals includes a Red signal, a Green signal and a Blue signal.

29. An image capturing method to be implemented by employing a plurality of imaging elements, each of which converts incident light to electric signals including plural wavelength signals; and a plurality of filters, which respectively correspond to the plurality of imaging elements, and each of which separates high frequency components and low frequency components from the plural wavelength signals outputted by a corresponding one of the plurality of imaging elements, the method comprising:

generating each of plural low-luminance signals by mixing the low frequency components, separated by a corresponding one of the plurality of filters, with each other at a first-predetermined mixture ratio;

generating each of plural high-luminance signals by mixing the high frequency components, separated by a corresponding one of the plurality of filters, with each other at a second-predetermined mixture ratio;

generating each of plural luminance signals, which respectively correspond to the plurality of imaging elements, by adding each of the plural low-luminance signals to a corresponding one of the high-luminance signals;

detecting a distance to the subject, based on a correlation between the plural luminance signals.

30. The image capturing method of claim 29, wherein a combination of coefficients, to be respectively multiplied to the low frequency components, is established as the first-predetermined mixture ratio.

31. The image capturing method of claim 29, further comprising:

detecting a relative positional relationship between images of the subject, which are respectively projected onto the plurality of imaging elements;

wherein the second-predetermined mixture ratio of the high frequency components is changed corresponding to a result detected in the detecting step.

32. The image capturing method of claim 31,
wherein the mixture ratio is changed in such a manner that, when a distance between a corresponding one of the plurality of imaging elements and the subject is far, a ratio of high frequency components of longer-wavelength signals is increasing, while, when the distance between a corresponding one of the plurality of imaging elements and the subject is near, a ratio of high frequency components of shorter-wavelength signals is increasing.

33. The image capturing method of claim 31,
wherein the mixture ratio is changed in such a manner that, when a distance between images of the subject, respectively projected onto the plurality of imaging elements, is relatively near from each other, a ratio of high frequency components of longer-wavelength signals is increasing, while, when the distance between the images of the subject, respectively projected onto the plurality of imaging elements, is relatively far from each other, a ratio of high frequency components of shorter-wavelength signals is increasing.

34. The image capturing method of claim 31,
wherein the mixture ratio is changed by changing coefficients to be respectively multiplied to the high frequency components.

35. The image capturing method of claim 31,
wherein the mixture ratio is changed for every one of plural subjects projected onto a corresponding one of the plurality of imaging elements.

36. The image capturing method of claim 29,
wherein the plural wavelength signals includes a Red signal, a Green signal and a Blue signal.

37. An image capturing method to be implemented by employing a plurality of imaging elements, each of which converts incident light to electric signals including plural wavelength signals; and a plurality of filters, which respectively correspond to the plurality of imaging elements, and each of which separates high frequency components from the plural wavelength signals outputted by a corresponding one of the plurality of imaging elements, comprising:
  detecting a distance to a subject, based on a correlation between high-luminance signals, each of which is generated by mixing the high frequency components with each other for every one of the plurality of imaging elements.

38. The image capturing method of claim 37, further comprising:
  detecting a relative positional relationship between images of the subject, which are respectively projected onto the plurality of imaging elements;
  wherein a mixture ratio of the high frequency components is changed corresponding to a result detected in the detecting step.

39. The image capturing method of claim 38,
wherein the mixture ratio is changed in such a manner that, when a distance between a corresponding one of the plurality of imaging elements and the subject is far, a ratio of high frequency components of longer-wavelength signals is increasing, while, when the distance between a corresponding one of the plurality of imaging elements and the subject is near, a ratio of high frequency components of shorter-wavelength signals is increasing.

40. The image capturing method of claim 38,
wherein the mixture ratio is changed in such a manner that, when a distance between images of the subject, respectively projected onto the plurality of imaging elements, is relatively near from each other, a ratio of high frequency components of longer-wavelength signals is increasing, while, when the distance between the images of the subject, respectively projected onto the plurality of imaging elements, is relatively far from each other, a ratio of high frequency components of shorter-wavelength signals is increasing.

41. The image capturing method of claim 37,
wherein the mixture ratio is changed for every one of plural subjects projected onto a corresponding one of the plurality of imaging elements.

42. The image capturing method of claim 37,
wherein the plural wavelength signals includes a Red signal, a Green signal and a Blue signal.

* * * * *